United States Patent [19]

Pettesch

[11] Patent Number: 5,213,137
[45] Date of Patent: May 25, 1993

[54] CHECK VALVE SHEAR FITTING WITH TEST PORT

[75] Inventor: Martin C. Pettesch, Roselle, N.J.

[73] Assignee: Universal Valve Company, Inc., Elizabeth, N.J.

[21] Appl. No.: 734,950

[22] Filed: Jul. 24, 1991

[51] Int. Cl.$^5$ .............................................. F16K 17/40
[52] U.S. Cl. .................................... 137/797; 137/68.1; 137/356; 285/2; 285/61
[58] Field of Search ...................... 137/68.1, 356, 797; 248/74.1; 285/2, 4, 61, 93

[56] References Cited

U.S. PATENT DOCUMENTS

| | | | |
|---|---|---|---|
| 2,048,388 | 7/1936 | Johnsen | 137/68.1 |
| 2,898,926 | 8/1959 | Tsiguloff | 137/68.1 |
| 2,910,080 | 10/1959 | Wright et al. | 137/68.1 X |
| 2,962,035 | 11/1960 | Wright et al. | 137/68.1 X |
| 2,965,116 | 12/1960 | Boone et al. | 137/68.1 X |
| 3,209,773 | 10/1965 | Klaus | 137/68.1 |
| 3,378,021 | 4/1968 | Milo | 137/68.1 |
| 3,489,160 | 1/1970 | Moore | 137/68.1 |
| 3,512,317 | 5/1970 | Lynch | 137/68.1 X |
| 3,515,157 | 6/1970 | Milo | 137/68.1 |
| 4,729,532 | 3/1988 | Moss | 248/74.1 |
| 5,099,870 | 3/1992 | Moore et al. | 137/68.1 X |

Primary Examiner—Gerald A. Michalsky
Attorney, Agent, or Firm—Klein & Szekeres

[57] ABSTRACT

A shear fitting for coupling a downstream vertical conduit to an upstream vertical conduit in, for example, an underground suction-type fuel delivery system, includes a hollow body defining a fluid flow passage between an inlet in an upstream body portion and an outlet in a downstream body portion. The upstream body portion is configured to be removably coupled to the upstream conduit, and the downstream body portion is configured to be removably coupled to the downstream conduit. The body has a peripheral shear groove defining a frangible annular wall portion that fractures in response to a shear force of more than a predetermined magnitude. A test port extends from the flow passage to the exterior of the body, the port being sealed by a removable closure. Removal of the closure results in a loss of prime in a suction-type fuel delivery system only if there is no check valve in the conduit upstream from the shear fitting, thereby allowing verification of the absence of such a check valve.

13 Claims, 2 Drawing Sheets

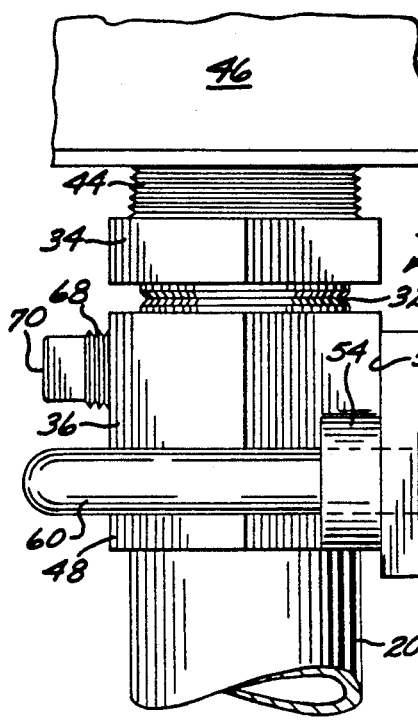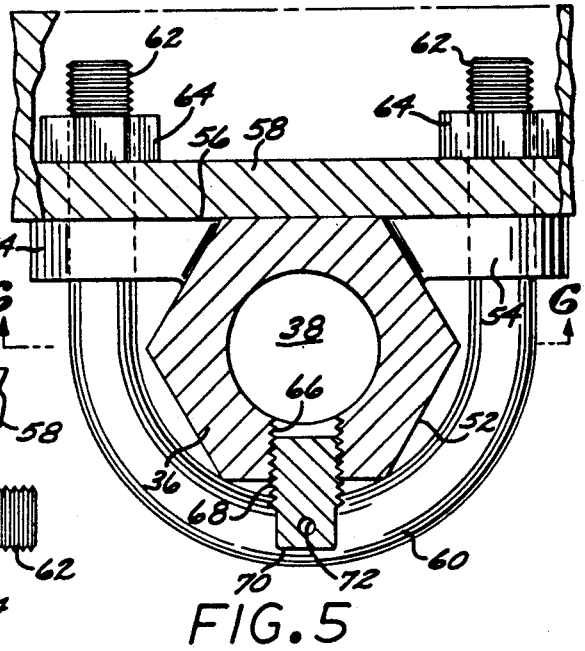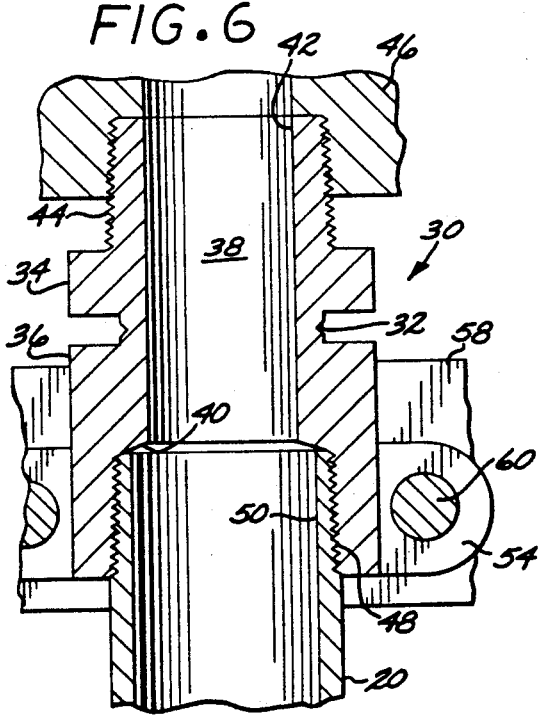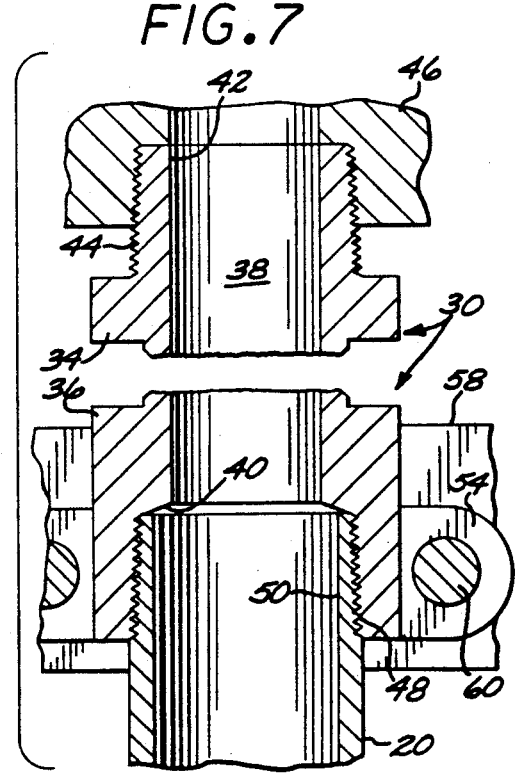

CHECK VALVE SHEAR FITTING WITH TEST PORT

BACKGROUND OF THE INVENTION

This invention relates generally to the field of fuel storage and pumping systems. More specifically, the present invention relates to the field of valves and fittings used in such systems, and particularly to the class of devices known as shear fittings.

Fuel storage and delivery systems for service stations and the like are constructed in a variety of configurations. Typically, fuel is stored in a large underground tank for delivery, via an above-ground pump, to motor vehicles. Such systems are generally divided into two categories: submersible systems and suction systems. In both types of systems, the fuel is conducted from the tank to the pump through a fuel pipe that enters the pump below the ground. In suction systems, a negative (subatmospheric) pressure is applied at the pump end of the fuel pipe to dispense the fuel. A check valve is installed in the fuel pipe at or near its juncture with the pump, that is, at the pump inlet. The check valve opens in response to the application of the subatmospheric pressure to its downstream side by the pump, and closes in response to pump shut-off, thereby maintaining "prime" in the pipe.

It has become standard practice to incorporate a peripheral "shear groove" in the external wall of the check valve housing on the upstream side of the valve seat. The shear groove provides a weakened, frangible wall portion that will break if the pump is accidentally knocked over. By providing such a break point near the pump inlet, damage to buried fuel piping is minimized. If the valve is broken at the shear groove, there will be a loss of "prime" in the pipe below the valve, causing the fuel to fall back into the tank. Fuel that is in the pipe above the shear groove is prevented from spilling by the check valve element, because, as previously mentioned, the shear groove is upstream from the valve seat.

One drawback to the incorporation of the shear groove in the check valve housing itself is that the entire check valve assembly must be replaced in the event of a break. Not only is such replacement relatively expensive, but it presents a potential for the leakage of fuel captured between the check valve and the pump.

Another drawback stems from recent legislation that requires verification that an angle check valve or a foot valve is not present in the system. The prior art check valves offer no convenient means for such verification without removal of the entire valve assembly.

There has been, therefore, a long-felt need for means for providing the shear groove function, without requiring the removal of the entire valve assembly in the event of a shear groove break, thereby minimizing leakage of fuel between the shear groove and the pump. There has been a further need for providing, along with such shear groove means, some convenient means for verifying the absence of an angle check valve or a foot valve in the system, without removal of the check valve assembly.

SUMMARY OF THE INVENTION

Broadly, the present invention is a shear fitting for a check valve in a suction-type fuel delivery system, wherein the shear fitting is removably connectable to the upstream or inlet side of the check valve, and wherein the shear fitting includes means for verifying the absence of a check valve upstream from the shear fitting.

More specifically, in accordance with a preferred embodiment of the invention, the shear fitting comprises a hollow body defining a flow passage between an inlet end and an outlet end. The body is adapted to be removably coupled to the upstream side or inlet of a vertical check valve installed in a vertical underground pipe leading from a fuel storage tank to a dispensing pump. The body has a peripheral groove defining a frangible wall area, such that a physical shock delivered to the pipe at or above the check valve that produces a shear force of predetermined magnitude, causes the shear fitting to fracture at the groove. The body further includes a test port opening to the exterior of the body from the flow passage, the port being sealed by a removable closure. Removal of the closure causes a loss of prime in the pipe only if an upstream (foot or angle) check valve has not been installed. The port is further adapted for the installation of a vacuum gauge, if desired.

In use, a collision with the dispensing pump causes the shear fitting to divide at the shear groove, thereby preventing the transmittal of shock to the underground pipe, and thus minimizing damage to the system. The shearing of the shear fitting causes a loss of prime in the pipe upstream from the fitting, while the vertical check valve minimizes loss of fuel downstream from the fitting. Repair is effected by replacing the sheared fitting segments with a new fitting. Since the fitting is not part of the check valve, but, instead, is removable therefrom, the check valve does not have to be replaced.

Verification of the absence of a foot or angle check valve is accomplished without disassembly of the system, by merely removing the test port closure and observing whether the prime is lost. Alternatively, a vacuum gauge can be installed in the test port for verification and/or monitoring purposes.

Thus, as will be more fully appreciated from the detailed description that follows, the present invention provides advantages that have heretofore been unattainable in the prior art.

BRIEF DESCRIPTION OF THE DRAWINGS

FIG. 4 is a side elevational view of the present invention, taken along line 4—4 of FIG. 2;

FIG. 5 is a cross-sectional view of the present invention, taken along line 5—5 of FIG. 2, with a portion of the mounting structure broken away for clarity;

FIG. 6 is a cross-sectional view taken along line 6—6 of FIG. 5; and

FIG. 7 is a cross-sectional view, similar to that of FIG. 6, but showing the shear fitting after it has been fractured.

DETAILED DESCRIPTION OF A PREFERRED EMBODIMENT

Figure 1:
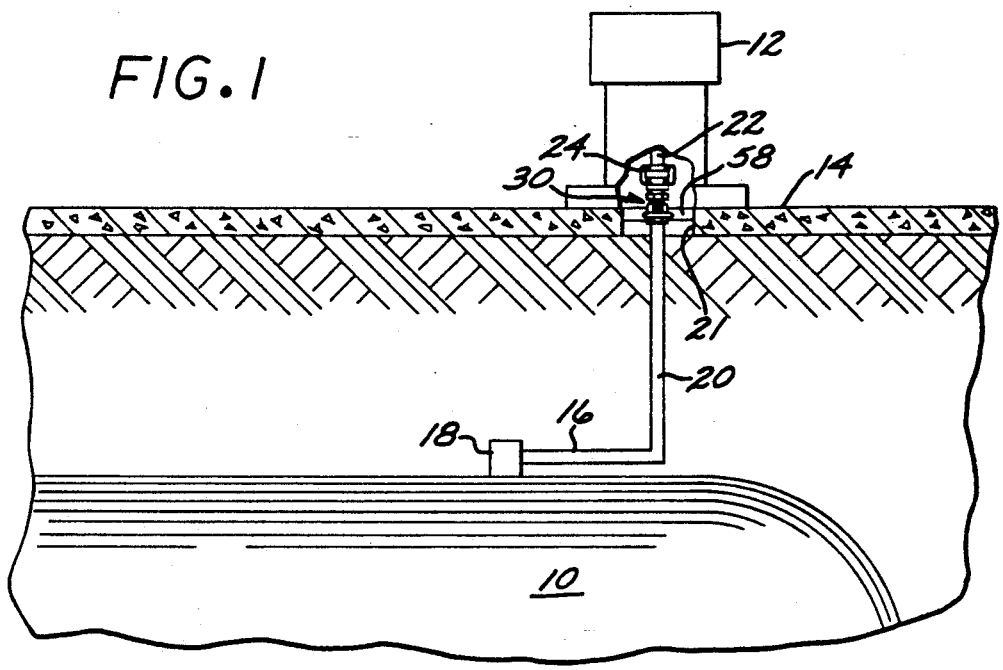
FIG. 1 is a semischematic view of a portion of a suction-type fuel delivery system, showing a shear fitting in accordance with the present invention installed in such a system.
Figure 2:
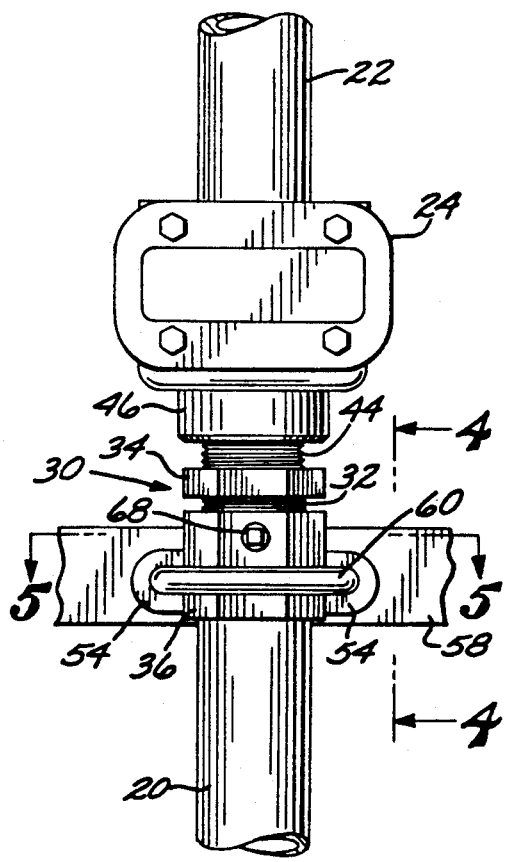
FIG. 2 is a front elevational view of a shear fitting, in accordance with a preferred embodiment of the present invention, installed upstream from a check valve in a system of the type shown in FIG. 1.

Referring now to the drawings, FIG. 1 shows an underground fuel storage and delivery system, of the suction type. The system comprises an underground fuel storage tank 10, connected by a system of conduits or pipes to a dispensing pump 12 mounted on an aboveground support surface or slab 14. The pipe or conduit system shown in FIG. 1, simplified for illustrative purposes, comprises a horizontal pipe 16 connected to a tank outlet fitting 18, and a first or upstream vertical conduit 20 that extends upwardly from the downstream end of the horizontal pipe 16, through an access hole 21 in the support surface 14, to the pump 12.

Contained within the pump enclosure is a second, or downstream, vertical conduit 22 connected to the downstream end of the upstream vertical conduit 20 through a check valve 24. The check valve 24, which may be one of the various conventional designs commonly used in such systems, allows fuel to flow upwardly into the pump 12, but not downwardly from the pump.

As shown in the drawings, a shear fitting 30, in accordance with a preferred embodiment of the invention, is coupled between the downstream end of the upstream vertical conduit 20 and the upstream, or inlet side, of the check valve 24. The shear fitting 30 comprises a hollow body divided by a peripheral shear groove 32 into a downstream body portion 34 and an upstream body portion 36. The body defines an internal flow passage 38 extending substantially without internal obstructions or restrictions, from an inlet 40 in the upstream body portion 36, to an outlet 42 in the downstream body portion 34. The peripheral shear groove 32 defines a frangible annular body wall portion of reduced thickness that is susceptible to fracture in response to shear forces of a predetermined magnitude.

As best shown in FIGS. 6 and 7, the downstream body portion 34 advantageously includes an externally-threaded downstream coupling portion 44. The downstream coupling portion 44 terminates in the outlet 42, and is adapted for removable coupling to an internally-threaded fitting 46 on the inlet side of the check valve 24, thereby fluidly coupling the outlet 42 to the inlet side of the check valve. Similarly, the upstream body portion 36 advantageously includes an internally-threaded upstream coupling portion 48, extending upstream from the inlet 40. The upstream coupling portion 48 is adapted for removable coupling to an externally-threaded fitting 50 on the downstream end of the vertical pipe 20, thereby fluidly coupling the upstream vertical conduit 20 to the shear fitting inlet 40. The shear groove 32 is preferably located closer to the downstream coupling portion 44 than to the upstream coupling portion 48.

The external surfaces of the downstream and upstream body portions 34 and 36 are preferably formed with one or more flats 52. To this end, a hexagonal cross-sectional configuration for the body, as shown in FIG. 5, is most advantageous.

The upstream body portion 36 is formed with a pair of apertured appendages or ears 54 extending outwardly from either side of the body. The ears 54 are configured so as to define a substantially continuous planar mounting surface 56 with one of the flats 52, as best shown in FIG. 5. The ears 54 serve as mounting elements, by which the shear fitting can be removably fixed to a horizontal support member or bracket 58 for lateral stabilization in the access hole 21. In the illustrated embodiment, the bracket 58 is in the form of an angle iron, secured at its opposite ends to a support structure, such as the interior surface of the access hole 21. A U-bolt 60, having threaded ends 62 that receive threaded nuts 64, is the preferred means for fixing the shear fitting 30 to the bracket 58, although hex-head bolts (not shown) may also be used. The U-bolt 60 fits around and engages the exterior surface of the upstream body portion 36, with its threaded ends 62 extending through registering apertures in the ears 54 and the bracket 58, as shown in FIGS. 4 and 5. The nuts 64 are then threaded onto the U-bolt ends 62 until the mounting surface 56 of the shear fitting is tightly secured against the bracket 58.

Alternatively, the shear fitting may be secured and laterally stabilized in the access hole 21 by means of an anchoring device (not shown), of the type disclosed and claimed in U.S. Pat. No. 4,729,532, the disclosure of which is incorporated herein by reference. If such an anchoring device is used, the U-bolt 60 and nuts 64 would be those that are employed as components of the anchoring device.

As best shown in FIG. 5, the upstream body portion 36 is provided with a test port 66 that extends radially from the flow passage 38 to the exterior of the fitting body. The test port is internally threaded to receive an externally threaded removable closure or plug 68. The plug 68 preferably has a square or hex head 70 to facilitate installation and removal by a wrench or the like, and it may have a transverse hole 72 through the head 70 to accommodate a removable handle or lever (not shown). The purpose of the test port 66 and its associated plug 68 will be explained below.

The structure of the shear fitting 30 having been fully described, its manner of use will now be easily understood.

In an underground fuel delivery system, of the type described above, a forceful impact against the pump 12 (which might result, for example, from a collision by a motor vehicle) would produce a strong, laterally-directed shear force that would be transmitted throughout the underground fuel pipe system. This shear force could produce severe damage to the more deeply buried components of the system, requiring great expense, time, and effort to repair.

Figure 3:
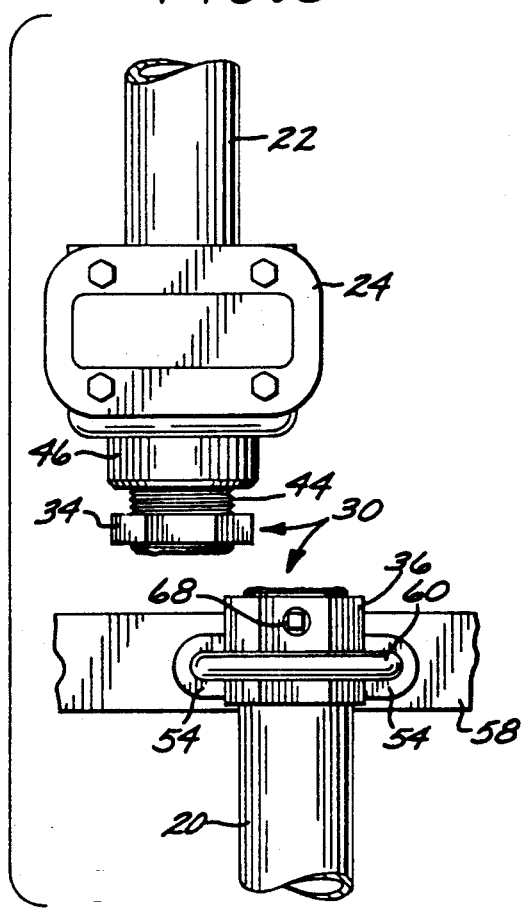
FIG. 3 is a view similar to that of FIG. 2, but showing the shear fitting after it has been fractured.

With the shear fitting 30 installed, however, in the manner described above and illustrated in the drawings, such damage is minimized, as follows: Any shear force of more than a predetermined magnitude that is transmitted to the shear fitting 30 results in a fracture of the shear fitting at the weakened annular wall portion defined by the shear groove 32, as shown in FIGS. 3 and 7. The result is that only the downstream body portion 34, the check valve 24 to which it is coupled, and the downstream vertical conduit 22 downstream from the check valve, are displaced laterally by the force of the impact. The fracture prevents the transmission of shear forces to the upstream body portion 36, which, because it is secured to the bracket 58, isolates those components upstream from the shear fitting from the shear forces.

When the shear fitting fractures, as described above, there is a loss of prime in the system, with the result that all fuel in the system upstream from the fracture flows back into the tank 10. All fuel downstream from the check valve 24 is prevented from spilling because check valve closes against backflow. Thus, the only fuel lost is the relatively minuscule amount between the fracture and the check valve. (It will be appreciated that the closer the shear groove 32 is to the inlet side of the check valve, the smaller the amount of fuel lost when the shear fitting fractures.)

After the shear fitting has fractured, the U-bolt 60 is removed, and the separated upstream and downstream body portions are simply uncoupled from the upstream vertical conduit 20 and the check valve 24, respectively. A new shear fitting is then installed. Since the shear fitting and the check valve are separate components, there is no need to replace the check valve, thereby reducing the repair costs substantially.

The test port 66 provides a means for determining whether an angle check valve or foot valve has been installed in the system, such installation being contrary to current regulations. To make such a determination, the plug 68 is removed from the port 66 by turning it with a suitable implement. If a loss of prime is experienced upon removing the plug, it indicates that no angle check valve or foot valve is present in the system. If there is no loss of prime, then such a valve has been installed. The test port 66 is advantageously dimensioned and configured to receive a "vacuum" gauge (not shown) instead of the plug 68. The vacuum gauge will indicate a subatmospheric pressure only if no angle check valve or foot valve is in the system.

From the foregoing, it can be appreciated that the present invention provides the shearing function that isolates most of the underground components of the fuel delivery system from shear force-induced damage, but without requiring the removal of the entire check valve assembly in the event of a shear groove break, thereby minimizing leakage of fuel between the shear groove and the pump. The present invention also provides, along with the shearing function, convenient means for verifying the absence of an angle check valve or a foot valve in the system, without removal of the check valve assembly.

While a preferred embodiment of the invention has been described above, it will be appreciated that a number of modifications and variations may suggest themselves to those skilled in the pertinent arts. For example, means other than an annular groove may be devised to form the weakened, frangible wall portion that provides the shearing function. Furthermore, as noted above, there are a variety of ways to achieve suitable lateral securing and stability of the shear fitting body when it is installed. These and other variations and modifications are considered to be within the spirit and scope of the present invention.

What is claimed is:

1. Apparatus for coupling an upstream vertical conduit to a downstream vertical conduit, in a fluid delivery system wherein the upstream conduit is coupled to a tank containing a fluid and the downstream conduit is coupled to fluid dispensing means that applies a sub-atmospheric pressure to the fluid in the tank, the apparatus comprising:

check valve means, in the downstream conduit, for preventing backflow from the dispensing means to the tank; and a shear fitting, comprising:
a unitary body having a downstream portion with downstream coupling means for removable coupling to the check valve means, and an upstream portion integral with the downstream portion, and having upstream coupling means for removable coupling to the upstream vertical conduit;

a substantially unobstructed, unrestricted, and unrestrictable fluid flow passage extending through the body between an inlet in fluid communication with the upstream coupling means and an outlet in the downstream coupling means;

frangible means in the body defining a weakened body wall portion at a location that is closer to the downstream coupling means than to the upstream coupling means, whereby the weakened body wall portion fractures in response to a shear force delivered to the downstream conduit that is greater than a predetermined magnitude, thereby separating the downstream body portion from the upstream body portion, and isolating the upstream conduit from the shear force; and test port means, in the unitary body, extending from the flow passage to the exterior of the body, for permitting a determination of the loss of prime in the upstream conduit.

2. The apparatus of claim 1, wherein the test port means comprises:
a test port extending from the flow passage to the exterior of the body; and
removable closure means for the test port.

3. The apparatus of claim 1, wherein the frangible means comprises:
a peripheral shear groove defining a weakened body wall portion that is substantially annular.

4. The apparatus of claim 1, further comprising:
a horizontal support member; and
attachment means for removably fixing the body to the horizontal support member.

5. The apparatus of claim 4, wherein the attachment means comprises:
an apertured appendage on each side of the upstream body portion; and
threaded means, insertable through each apertured appendage, for removably securing the apertured appendages to the support member.

6. The apparatus of claim 5, wherein the support member has apertures that register with the apertures in the appendages, and wherein the threaded means includes a U-bolt that fits around and engages the upstream body portion, the ends of the U-bolt being insertable through the apertured appendages and through the registering apertures in the support member.

7. The apparatus of claim 1, wherein the downstream coupling means includes an externally-threaded portion that terminates in the outlet, and wherein the upstream coupling means includes an internally-threaded portion that extends upstream from the inlet.

8. A shear fitting for coupling an upstream vertical conduit to a downstream vertical conduit, the upstream conduit being coupled to a tank containing a fluid and the downstream conduit being coupled to fluid dispenser means that applies a sub-atmospheric pressure to the fluid in the tank, the shear fitting comprising:
a unitary body having a downstream portion with downstream coupling means for removable coupling to the downstream conduit, and an upstream portion integral with the downstream portion, and having upstream coupling means for removable coupling to the upstream vertical conduit;
a substantially unobstructed, unrestricted, and unrestrictable fluid flow passage extending through the body between an inlet in fluid communication with the upstream coupling means and an outlet in the downstream coupling means;

frangible means in the body defining a weakened body wall portion at a location that is closer to the downstream coupling means than to the upstream coupling means, whereby the weakened body wall portion fractures in response to a shear force delivered to the downstream conduit that is greater than a predetermined magnitude, thereby separating the downstream body portion from the upstream body portion, and isolating the upstream conduit from the shear force;

a horizontal support member;

attachment means for removably fixing the body to the support member; and test port means, in the unitary body, extending from the flow passage to the exterior of the body, for permitting a determination of the loss of prime in the upstream conduit.

9. The shear fitting of claim 8, wherein the test port means comprises:

a test port extending from the flow passage to the exterior of the body; and removable closure means for the test port.

10. The shear fitting of claim 8, wherein the frangible means comprises:

a peripheral shear groove defining a weakened body wall portion that is substantially annular.

11. The shear fitting of claim 8, wherein the attachment means comprises:

an apertured appendage on each side of the upstream body portion; and threaded means, insertable through each apertured appendage, for removably securing the apertured appendages to the support member.

12. The shear fitting of claim 11, wherein the support member has apertures that register with the apertures in the appendages, and wherein the threaded means includes a U-bolt that fits around and engages the upstream body portion, the ends of the U-bolt being insertable through the apertured appendages and through the registering apertures in the support member.

13. The shear fitting of claim 8, wherein the downstream coupling means includes an externally-threaded portion that terminates in the outlet, and wherein the upstream coupling means includes an internally-threaded portion that extends upstream from the inlet.

* * * * *